United States Patent [19]

Pogozelski et al.

[11] 4,145,515

[45] Mar. 20, 1979

[54] METHOD OF FORMING STORAGE-STABLE POLYURETHANE PREPOLYMERS

[75] Inventors: Vincent F. Pogozelski, Newtown, Pa.; Robert P. Conger, Park Ridge, N.J.

[73] Assignee: Congoleum Corporation, Milwaukee, Wis.

[21] Appl. No.: 746,448

[22] Filed: Dec. 1, 1976

[51] Int. Cl.$^2$ .................... C08G 18/10; C08G 18/42; C08G 18/48; C08G 18/82
[52] U.S. Cl. .................. 528/77; 260/30.4 N; 260/31.2 N; 260/31.4 R; 260/32.8 N; 260/33.6 UB; 260/33.8 UB; 528/44; 528/54; 528/55; 528/58; 528/76; 528/80; 528/85
[58] Field of Search .............. 260/33.6 UB, 77.5 AA, 260/77.5 AM, 77.5 AP; 528/44, 81, 84

[56] References Cited

U.S. PATENT DOCUMENTS

| | | | |
|---|---|---|---|
| B471,405 | 2/1976 | Barron | 260/77.5 AP |
| 2,901,467 | 8/1959 | Croco | 260/77.5 AP |
| 3,012,987 | 12/1961 | Ansul | 260/77.5 AP |
| 3,043,801 | 7/1962 | Wagner et al. | 260/77.5 AP |
| 3,049,513 | 8/1962 | Damusis et al. | 260/77.5 AP |
| 3,049,515 | 8/1962 | Damusis | 260/77.5 AP |
| 3,351,573 | 11/1967 | Skreckoski | 260/77.5 AB |
| 3,436,361 | 4/1969 | Wooster | 260/77.5 AP |
| 3,549,569 | 12/1970 | Farah et al. | 260/77.5 AT |
| 3,639,355 | 2/1972 | Wooster et al. | 260/77.5 AP |
| 3,642,703 | 2/1972 | Suzuki et al. | 260/77.5 AA |
| 3,705,132 | 12/1972 | Cuscurida | 260/77.5 AB |

OTHER PUBLICATIONS

Sienko et al. — Chemistry (2nd Ed.) (McGraw-Hill) (N.Y.) (1961), pp. 237–241.
Saunders et al. — Polyurethanes (part 1, Chemistry), pp. 152–154 (1962); (part 2, Technology), p. 532 (1964), (Interscience) (N.Y.).

*Primary Examiner*—H.S. Cockeram
*Attorney, Agent, or Firm*—Richard T. Laughlin

[57] ABSTRACT

Methods of forming liquid, low viscosity, low molecular weight, cross-linkable, stable polyurethane prepolymers which comprise: reacting polyisocyanates, and preferably aliphatic and cycloaliphatic diisocyanates, with polyhydroxy compounds or polyols, and preferably diols, triols, tetrols, and mixtures thereof; the polyols having a molecular weight of from about 62 to about 3000; the polyisocyanates and the polyols being added to the reaction mixture in an NCO/OH ratio in the range of from about 0.7:1 to about 6:1, and preferably from about 1.6:1 to about 4:1; the reaction taking place preferably in an inert, non-reactive organic solvent such as xylene; in the absence of any reaction catalysts, or in the presence of a relatively very low concentration of reaction catalysts of from about 0.00005% by weight to about 0.8% by weight, based on the total weight of the reaction mixture; at a reaction temperature of from about 0° C. to about 70° C., and preferably from about 0° C. to about 40° C., for a reaction time of from about ½ hour to about 12 hours; and terminating the reaction short of completion at a percent completion of reaction of from about 2% to about 95%, and preferably from about 30% to about 80%. The resulting liquid, low viscosity, low molecular weight, cross-linkable, stable polyurethane prepolymers are also included in the inventive concept.

11 Claims, No Drawings

METHOD OF FORMING STORAGE-STABLE POLYURETHANE PREPOLYMERS

THE BACKGROUND OF THE INVENTIVE CONCEPT

In the polyurethane foam, adhesive, elastomer, film, sheet, coating, casting, molding, and related fields, there are several different systems which are employed in order to form the polyurethane polymer or resin in its final form. One of these systems is often referred to as the "prepolymer" technique, as contrasted, for example, to the "one-shot" technique.

In the polyurethane prepolymer system, the two initial reactants are a polyisocyanate and a polyol. A fraction or a portion of the required stoichiometric amount of one reactant is pre-reacted with the full amount of the other reactant to form a polyurethane prepolymer which has either unreacted NCO or unreacted OH groups therein and a molecular weight which is intermediate in value between the molecular weight of the original monomer or monomers and that of the final polyurethane polymer or resin.

This polyurethane prepolymer of intermediate molecular weight may then be supplied to end-users with a second pre-mixed blend of the remaining portion of the required reactant, along with other optional additives and agents, such as catalysts, blowing agents, colorants, fire retardants, etc. The polyurethane prepolymer component and the pre-mixed blend are then mixed together, whereby a further reaction takes place and the final polyurethane polymer or resin is obtained by the end-user.

Naturally, it is very desirable that the polyurethane prepolymer possess certain properties and characteristics to insure its simple and easy use and handling by the end-user. For example, it should be liquid and be pourable or flowable, and have a low viscosity and low molecular weight so that it can be properly and easily pumped, metered, or otherwise handled during the subsequent reaction, or other further processing. Second, it must be cross-linkable to a sufficient degree so that it can relatively promptly dry and cure to the desired or required hardness or finish. Third, it must be sufficiently stable so that it possesses sufficient storage-life or shelf-life and does not crystallize or solidify, or thicken or gel too quickly to higher, undesirable viscosities, whereby pumping or metering, or other handling and use becomes difficult, or whereby other desirable properties and characteristics are changed or lost. And, fourth, it must be available in a high enough solids content so that large quantities of solvent or other carrier are not required.

PURPOSES AND OBJECTS OF THE INVENTIVE CONCEPT

It is therefore a principal purpose and object of the present inventive concept to provide a method of forming a polyurethane prepolymer which is in a liquid form, is readily pourable or flowable, has a low viscosity and a low molecular weight, is sufficiently cross-linkable, is stable, has excellent storage-life and shelf-life, and is available in relatively high solids content.

BRIEF SUMMARY OF THE INVENTIVE CONCEPT

It has been found that such principal purpose and object, and other principal purposes and objects which will become clear from a further reading and understanding of this disclosure, can be accomplished by reacting polyisocyanates, and preferably aliphatic or cycloaliphatic diisocyanates, with polyhydroxy compounds or polyols, and preferably diols, triols, tetrols, and mixtures thereof; the polyols having a molecular weight of from about 62 to about 3000; the polyisocyanates and the polyols being included in the reaction mixture in an NCO/OH ratio in the range of from about 0.7:1 to about 6:1, and preferably from about 1.6:1 to about 4:1; the reaction taking place preferably in an inert, non-reactive organic solvent such as xylene; in the absence of a reaction catalyst, or in the presence of a relatively very low concentration of a reaction catalyst of from about 0.00005% by weight to about 0.8% by weight, based on the total weight of the reaction mixture; at a relatively low reaction temperature of from about 0° C. to about 70° C., and preferably from about 0° C. to about 40° C., for a reaction time of from about ½ hour to about 12 hours; and terminating the reaction short of completion at a percent completion of reaction of from about 2% to about 95%, and preferably from about 30% to about 80%. The resulting liquid, low viscosity, low molecular weight, sufficiently cross-linkable, stable polyurethane prepolymers are also included in the present inventive concept.

DESCRIPTION OF PREFERRED OR TYPICAL EMBODIMENTS

The liquid, low viscosity, low molecular weight, cross-linkable, stable polyurethane prepolymers of the present inventive concept are formed preferably by bringing together under reactive conditions, a polyisocyanate, preferably an aliphatic or cycloaliphatic diisocyanate, preferably with less than the stoichiometric reacting amounts of a polyhydroxy compound or polyol, preferably a diol, triol, tetrol, or mixtures thereof, and incompletely reacting these reactants whereby the percent completion of reaction is in the range of from about 2% to about 95%, and preferably from about 30% to about 80%.

Such reaction may take place in one comprehensive reaction process, wherein, for example, a mixture of selected polyols is added simultaneously to the reaction mixture containing the polyisocyanate, but, preferably, takes place sequentially in a plurality of separate and successive reaction procedures wherein each particular type of polyol is added separately and sequentially to the reaction mixture containing the polyisocyanate.

For the purpose of illustrating one of the preferred or typical embodiments of the inventive concept, an aliphatic diol will be introduced into the reaction mixture containing the polyisocyanate first, and an aliphatic triol or tetrol will be added later. However, it is to be appreciated that such an order of procedure can be reversed and the aliphatic triol or tetrol can be introduced into the reaction mixture first and the aliphatic diol can be added later. Or, if so desired, two or three types of polyhydroxy-containing compounds or polyols can be added simultaneously, or the entire procedure can even be reversed completely.

A PREFERRED OR TYPICAL EMBODIMENT

The polyisocyanate, a reaction catalyst, and an inert, non-reactive organic solvent are preferably introduced first into the reaction flask which is equipped with an agitator and a thermometer. This is done normally at room or ambient temperatures, or lower. The diol is then slowly and steadily added at a generally constant rate and the reaction between the polyisocyanate and the diol commences substantially immediately.

The reaction is exothermic and the rate of addition of the diol is so regulated and controlled that the reaction temperature does not rise too high. Additionally, the reaction flask or reactor is equipped with both heating and cooling means in order to insure that the reaction temperatures remain in the desired range. Within the scope of the present inventive concept, the reaction temperatures are maintained in the range of from about 0° C. to about 70° C., and preferably from about 0° C. to about 40° C., the particular temperature employed depending upon the particular reactants involved.

The extent of the time of the addition of the diol will depend upon many factors and particularly the nature, type, and the amounts and concentrations of the polyisocyanate and diol involved in the reaction. Normally, however, the duration of time of the addition and the required reaction time is in the range of from about ½ hour to about 5½ hours for each specific type of polyol added, with the total time for the addition and reaction of all the types of polyols added sequentially normally being in the range of from about ½ hour to about 12 hours.

If the diol is to be the only polyhydroxy-containing compound to be reacted with the polyisocyanate, then the reaction is not permitted to go to completion but is terminated short of completion at a time when the percent completion of reaction is in the range of from about 2% to about 95%, and preferably from about 30% to about 80%. It is to be appreciated that, at such time, there still remains in the reaction mixture amounts of unreacted NCO and unreacted OH groups.

However, if another polyhydroxy-containing compound is to be reacted with the polyisocyanate in a subsequent reaction, then either such subsequent reaction, or the preceding reaction, or both reactions, are not carried out to substantial completion. In any event, it is essential that the overall reaction of all the polyhydroxy-containing compounds with the polyisocyanate not be carried out to substantial completion, or to substantial exhaustion of either unreacted NCO or unreacted OH groups in the reaction mixture.

If one or more polyhydroxy-containing compounds are to be reacted further with the polyisocyanate in a subsequent reaction or reactions, then, when the originally selected diol has been completely added to the reaction mixture but preferably not completely reacted with the polyisocyanate therein, then the subsequently selected polyhydroxy-containing compound or compounds are slowly and steadily introduced individually into the reaction mixture at a controlled, regulated rate, whereby the reaction temperature is again maintained in the desired range of from about 0° C. to about 70° C., and preferably from about 0° C. to about 40° C. The extent of the time of addition and reaction of such subsequently-added polyhydroxy-containing compounds is again each in the range of from about ½ hour to about 5½ hours, with the total time of addition and reaction of all the reactants being in the range of from about ½ hour to about 12 hours.

Normally, in the standard, conventional preparation of polyurethane prepolymers, the reaction between the normally unequal stoichiometric amounts of polyisocyanate and polyol proceeds to 100% completion, or at least substantially to completion, at which time either (1) all the available unreacted OH is exhausted from the reaction mixture, where the NCO/OH ratio was originally equal to or greater than 1:1, or (2) all the available unreacted NCO is exhausted from the reaction mixture where the NCO/OH ratio was originally equal to or less than 1:1. The exhaustion of such groups from the reaction mixture automatically ends any further reaction. The reaction is substantially complete.

In the reaction of the present inventive concept, however, the reaction is always terminated short of such completion and at a time when there are both available unreacted NCO and available unreacted OH still in the reaction mixture, and which would have reacted further, had the reaction not been terminated short of completion.

The final amounts and the concentrations of the available unreacted NCO and available unreacted OH are, of course, dependent upon the amounts and the concentrations of the polyisocyanate and the polyols introduced into the reaction mixture, as reflected by the overall NCO/OH ratio, by the temperature and the time-duration of the reaction, by the amount, concentration and type of reaction catalyst used, if any, and upon the percent completion of the reaction, at the time it is terminated. Such amounts and concentrations of the available unreacted NCO and the available unreacted OH are essential to the application of the present inventive concept and fall within certain specific ranges, as will be set forth herein.

The NCO and OH content in the reaction mixture composition, when the reaction is terminated, is calculated in terms of percent by weight, based on the total weight of the reaction mixture composition, including the solvent, if any, and varies widely, depending upon the above-mentioned factors. Normally, however, the values of the NCO and OH content in a 50% solids solution, which is very typical of the present inventive concept, fall within a range of from about 2% by weight to about 30% by weight, and from about 3% to about 15% by weight, preferably, for the NCO content, and from about 0.05% to about 10% by weight, and preferably from about 0.1% by weight to about 6% by weight, for the OH content, based on the total weight of the composition, including the solvent.

The reaction may be terminated in several ways but the preferred procedure is to reduce the temperature of the reaction mixture to a sufficiently low temperature whereat the reaction does not proceed at all, or to any material degree, or else proceeds at such a very low rate as to be considered substantially inactive. Reactions between different types of polyisocyanates and different types of polyols proceed at different temperatures in the absence of or in the presence of different amounts and concentrations of reaction catalyst used. The lowering of the temperature to a substantially non-active state may be accomplished by the use of ice or other coolant which can be applied around the reaction flask to effectively bring the temperature of the reaction mixture to approximately 0° C., or by the use of carbon dioxide, either in solid or liquid form, to bring the temperature down to as low as −40° C. or even lower. The use of cooling or refrigeration coils is also possible. Such low temperatures effectively terminate the reaction.

If a mixture of the various diols, triols, tetrols, or other polyols either of higher functionality or of a modified nature are reacted with the polyisocyanate, their proportions may vary widely and an individual polyol could be present in a very low percentage or a very high percentage, depending upon the nature, properties, and the characteristics desired in the final polyurethane prepolymer.

The proportions of the amounts of the polyisocyanate to the sum of the amounts of the polyols, that is, the overall initial NCO/OH ratio, as added to the reaction mixture at any time, is in the range of from about 0.7:1 to about 6:1, and preferably from about 1.6:1 to about 4:1.

The viscosities of the resulting polyurethane prepolymer compositions, at the time of the termination of the reaction, or therafter, are determined with a #2 spindle at 20 rpm at room temperature (Brookfield). These viscosity readings are taken normally immediately after the termination of the reaction, or within 24 hours thereafter, and then are repeated periodically every several days in order to determine any change in the viscosity of the polyurethane prepolymer composition. The viscosities vary to some extent, depending upon the solids content of the compositions investigated. For solids contents in the range of from about 20% to about 50%, viscosities of from about 10 centiposes to about 100 centipoises are normally obtained; for solids contents in the range of from about 50% to about 70%; viscosities of from about 20 centiposes to about 300 centipoises, and occasionally to 400 centipoises are normally obtained; and for solids contents greater than 70% and up to 100%, the viscosities may exceed 400 centipoises but the compositions are still flowable and are readily pourable and usable.

THE POLYISOCYANATES

The polyisocyanates used in carrying out the principles of the present invention are selected from a large group of aliphatic, aromatic, cycloaliphatic, and heterocyclic polyisocyanates. They include the following which are illustrative but not limitative.
4,4'-methylene-bis-cyclohexyl diisocyanate
hexamethylene-1,6-diisocyanate
tetramethylene-1,4-diisocyanate
cyclohexane-1,4-diisocyanate
1,4-cyclohexylene diisocyanate
2,2,4-trimethyl-1,6-hexane diisocyanate
trimethyl hexamethylene diisocyanate
dimer acid diisocyanate
trimer of hexamethylene diisocyanate
ethylene diisocyanate
ethylidene diisocyanate
2,4-tolylene diisocyanate
2,6-tolylene diisocyanate
p-phenylene diisocyanate
m-phenylene diisocyanate
4,4'-methylene bis(phenylisocyanate)
naphthylene-1,5-diisocyanate
4,4'-biphenylene diisocyanate
furfurylidene diisocyanate
butane-1,4-diisocyanate
isophorane diisocyanate

THE DIOLS

The diols used in carrying out the principles of the present inventive concept may be selected from a large group of diols or glycols, or derivatives thereof, such as polyether diols, polyester diols, etc. Illustrative of such suitable diols but not limitative thereof are the following:
ethylene glycol
diethylene glycol
triethylene glycol
tetraethylene glycol
pentaethylene glycol
propylene glycol
trimethylene glycol
tetramethylene glycol
pentamethylene glycol
hexamethylene glycol
neopentyl glycol The polyester glycols are condensation products of one or more of the above-identified glycols, or mixtures thereof, with an alkylene oxide having from 2 to 5 carbon atoms, such as ethylene oxide, propylene oxide, trimethylene oxide, 1,2-butylene oxide, isobutylene oxide, 1,4-tetramethylene oxide, pentamethylene oxide, or mixtures thereof. Also of use are the polyester glycols which are condensation products of one or more of the above-identified glycols, or mixtures thereof, with various saturated or unsaturated, aliphatic or aromatic dibasic acids, or mixtures of such acids.

THE TRIOLS

The triols or trihydroxy-containing compounds used in carrying out the principles of the present inventive concept may be selected from a large group of triols, or derivatives or condensation products thereof, such as polyether triols, polyester triols, etc. Illustrative but not limitative of such triols are the following:
glycerol
1,1,1-trimethylol propane
1,1,1-trimethylol ethane
1,2,3-butanetriol
1,2,4-butanetriol
1,2,3-pentanetriol
1,2,3-hexanetriol
1,2,4-hexanetriol
1,2,5-hexanetriol
1,2,6-hexanetriol
2,3,4-hexanetriol
1,3,6-hexanetriol The derivatives and condensation products of such triols are formed by chemical procedures analogous to the chemical procedures used in deriving analogous derivatives and condensation products of the diols.

THE TETROLS

The tetrols or tetrahydroxy-containing compounds used in carrying out the principles of the present inventive concept may be selected from the following polyols, or derivatives thereof, or condensation products thereof, as previously described. These polyols are, of course, illustrative but not limitative.
erythritol
pentaerythritol

OTHER POLYOLS

Polyols of higher functionality than four are also generally of use in the application of the principles of the present inventive concept. Polyhydroxy-containing compounds including pentols, such as adonitol and arabitol, for example, and hexitols, such as dulcitol, mannitol and sorbitol, for example, are also of use. These, of course may be used as is, or in the form of derivatives thereof, or condensation products thereof with various alkylene oxides, as previously described herein. "RUCOFLEX" (Hooker) R-102. a highly branched, low molecular weight of 700, ester polyol, having a hydroxyl number of 400, and a functionality of five is a specific example of such a polyol of a higher functionality.

Caprolactone polyols are also generally of application within the broader scope of the present invention. Such caprolactone polyols are based on or derived from hydroxy carboxylic acids. and are used as is, or as polymerization products thereof with various alkylene oxides, or as other derivatives thereof. Of particular application are caprolactone polyols PCP-0300 and PCP-0301 (Union Carbide) which are liquid caprolactone polyols having low viscosities, are trifunctional, have melting points of 20° C. or less, with molecular weights between about 300 and 540 and hydroxyl numbers, that is, mg. KOH/g, of between about 560 and 310, respectively.

Other polyhydroxy-containing compounds are also of use within the broader scope of the present inventive concept, provided they are capable of furnishing the necessary hydroxyl for reaction with the isocyanate in the formation of the polyurethane prepolymer. Typical of such other polyhydroxy-containing compounds are the poly(hydroxyalkyl) derivatives of such compounds as the alkylenepolyamines, or the various polyether polyols with amine. One specific example of such a group is "QUADROL" (BASF-Wyandotte) which is N,N,N,N'-tetrakis (2-hydroxypropyl) ethylenediamine, a colorless viscous liquid having a functionality of four, a molecular weight of 292, a hydroxyl number of 770, and a boiling point of 190° C. (1 mm.).

CATALYSTS

Many useful catalysts for the polyurethane prepolymer reaction are well known and may be employed in carrying out the principles of the present inventive concept. Organo-metallic compounds and suitable tertiary amines are among the most frequently used. Such catalysts include:
dibutyl tin dilaurate
dibutyl tin di-2-ethylhexoate
dibutyl tin diacetate
dibutyl tin oxide
tributyl tin acetate
tetramethyl tin
dimethyl dioctyl tin
stannous octoate
lead octoate
lead naphthenate
copper naphthenate
N-methyl diethanolamine
N,N-dimethyl ethanolamine
N-methyl morpholine
diethyl cyclohexylamine
triethylamine Such catalysts are normally present in the reaction mixture in the range of from about 0.00005% to about 0.8% by weight, based on the total weight of the reaction mixture, including the solvent, if any, or they may be omitted, if the reaction proceeds satisfactorily without them.

SOLVENTS

Any suitable inert, non-reactive organic solvent not having any reactive hydrogens in its structure may be used in carrying out the principles of the present inventive concept. Such include:
xylene
toluene
methyl ethyl ketone
methyl isobutyl ketone
dimethyl ketone
tetrahydrofuran
ethyl acetate
ethylene glycol monoethyl ether acetate
isopropyl ether
2-ethoxyethyl acetate
pertoleum hydrocarbon distillate fractions
toluene-methylene chloride mixtures
cyclohexanone The present invention will be further described with particular reference to the following specific Examples, wherein there are disclosed typical and preferred embodiments of the present inventive concept. However, it is to be stated that such specific Examples are primarily illustrative of the present invention and are not to be construed as limitative of the broader aspects thereof, except as defined and limied by the scope of the attached claims.

EXAMPLE I

A liquid, low viscosity, low molecular weight, cross-linkable, stable polyurethane prepolymer composition having excellent shelf-life and storage-life is formed from the following reactants:

| | Grams |
|---|---|
| HYLENE W (duPont) a soft, solid methylene-bis (4-cyclohexylisocyanate, molecular weight 264, 31.8% minimum NCO content | 6900 |
| TERACOL 650 (duPont) a waxy white solid polytetramethylene ether glycol, molecular weight 650, hydroxyl number 174 | 3600 |
| PLURACOL PeP 450 Tetrol (BASF Wyandotte) a polyoxyalkylene polyol based on pentaerythritol, molecular weight 400, hydroxyl number 560 | 1800 |

The 3600 grams of TERACOL 650 diol is fed into a reaction flask equipped with an agitator and thermometer and containing the 6900 grams of HYLENE W diisocyanate, 3600 grams of xylene as the inert, non-reactive organic solvent, and 0.36 grams of dibutyl tin dilaurate as the reaction catalyst. The temperature of the reaction mixture at the start of the reaction of the diisocyanate and the diol is 21° C. and the addition of the diol is slow and steady and requires about 2-½ hours for complete addition, during which time hot water heat is applied to the reaction flask from time to time and the reaction mixture rises to a maximum temperature of about 33° C. The 1800 grams of PLURACOL PeP 450 Tetrol is then added in 9240 grams of xylene at a slow and steady rate over a period of 3-¼ hours and hot water heat is applied from time to time and the reaction mixture rises to a maximum temperature of about 37° C. The reaction is terminated by cooling the reaction flask to a temperature of about 0° C. with ice.

The following data is derived:
NCO/OH ratio is 1.80/1
Total xylene as inert, non-reactive organic solvent is 12,300 grams
Mc (equivalent weight between cross-link sites in the polyurethane prepolymer) is 1,367
Percent solids is 50%
Viscosity (within 24 hours after termination of reaction) is 34 cps
NCO content (% by weight of total composition, including solvent)
initial at start of reaction is 8.92% theory (maximum remaining if 100% completion of reaction) 3.96%
actual at termination of reaction is 5.28%
Percent completion of reaction is 73.5%
Percent of unreacted OH at termination of reaction is 0.53%
Percent catalyst is 0.0015% the polyurethane prepolymer composition is kept in a freezer which is maintained at a temperature of −10° C. for a period of fourteen days and did not thicken, gel, or crystallize. There is no substantial change in the viscosity or in other properties and characteristics.

EXAMPLE II

The procedure described in Example I are followed substantially as set forth therein with the exception that the order of addition of the reactants is reversed. The PLURACOL PeP 450 Tetrol is added first to the reaction mixture which contains the diisocyanate, the xylene, and the dibutyl tin dilaurate, and the the TERACOL 650 diol is added subsequently. The temperature of the reaction mixture at the time of the addition of the tetrol is about 23° C.: the maximum temperature reached during the reaction between the diisocyanate and the tetrol is about 39° C.; and the maximum temperature reached during the reaction between the diisocyanate and the diol is about 38.5° C. The time of addition of the tetrol is about 3 hours and the time of addition of the diol is about 2 hours. The reaction is terminated by cooling with ice to a temperature of about 0° C.

The following data is derived:
NCO/OH ratio is 1.80/1
Total xylene as inert, non-reactive organic solvent is 12,300 grams
Percent solids is 50%
Viscosity (within 24 hours after termination of reaction) is 30 cps
NCO content (% by weight of total composition, including solvent)
 initial at start of reaction is 8.92
 theory (maximum remaining if 100% completion of reaction) 3.96%
 actual at termination of reaction is 5.43%
Percent completion of reaction is 70.4%
Percent catalyst is 0.0015%

EXAMPLE III

The procedures described in Example I are followed substantially as set forth therein with the exception that the 1800 grams of PLURACOL PeP 450 Tetrol is replaced by 2200 grams of PLURACOL PeP 550 Tetrol which is also a polyoxypropylene material based on pentaerythritol but has a hydroxyl number of 448 and a molecular weight of 500. The results of this Example are generally comparable to the results which are obtained in Example I. The polyurethane prepolymer composition is liquid, has a satisfactorily low viscosity and molecular weight, is sufficiently cross-linkable, and is adequately stable and possesses excellent shelf-life and storage-life.

EXAMPLE IV

The procedures described in Example I are followed substantially as set forth therein with the exception that the 1800 grams of PLURACOL PeP 450 Tetrol is replaced by 2600 grams of PLURACOL PeP 650 Tetrol which is also a polyoxypropylene material based on pentaerythritol but has a hydroxyl number of 374 and a molecular weight of 600. The results of this Example are generally comparable to the results which are obtained in Example I. The polyurethane prepolymer composition is liquid, has a satisfactorily low viscosity and molecular weight, is sufficiently cross-linkable, and is adequately stable and possesses excellent shelf-life and storage-life.

EXAMPLE V

The procedures described in Example I are followed substantially as set forth therein with the exception that the 3600 grams of TERACOL 650 is replaced by 5500 grams of TERACOL 1000 which is also a polytetramethylene ether glycol but has an average hydroxyl number of 113 and an average molecular weight of 1000. The results of this Example are generally comparable to the results obtained in Example I

EXAMPLES VI, VII, and VIII

The procedures described in Example I are followed substantially as set forth therein with the exception that the 3600 grams of TERACOL 650 diol having a molecular weight of 650 is replaced by:
Example VI: 1650 grams of polyethylene glycol 300 (mol. wt. 300)
Example VII: 2200 grams of polyethylene glycol 400 (mol. wt. 400)
Example VIII: 3300 grams of polyethylene glycol 600 (mol. wt. 600)
The results which are obtained in these Examples are generally comparable to the results obtained in Example I.

EXAMPLES IXa and IXb

The procedures of Example I are followed substantially as described therein with the exception that the reaction catalysts are (Example IXa) dibutyl tin di-2-ethylhexoate and (Example IXb) dibutyl tin oxide. The results obtained in these Examples are generally comparable to the results obtained in Example I.

|   |   | EXAMPLE | | | | |
|---|---|---|---|---|---|---|
|   |   | X | XI | XII | XIII | XIV |
| 1. | HYLENE W | 169 | 169 | 180 | 6900 | 230 |
| 2. | VORANOL P400 | 42 | 42 | | | |
| 3. | TERACOL 650 | | | | 3600 | 65 |
| 4. | TERACOL 2000 | | | 240 | | |
| 5. | VORANOL 2026 | | | | | |
| 6. | VORANOL 2070 | | | | | |
| 7. | PLURACOL TP440 | 82 | 82 | | | |
| 8. | PEP 550 | | | | | |
| 9. | PEP 450 | | | 40 | 1800 | 77 |
| 10. | DBTL 1% | | | | | |
| 11. | DBTL 10% | | | | 3.6 | |
| 12. | DBTL 100% | 0.3 | 0.7 | 2.2 | | 0.1 |
| 13. | Xylene | 293 | 293 | 460 | 12300 | 372 |
| 14. | Total Weight | 586.3 | 586.7 | 922.2 | 24604 | 744.1 |

-continued

|    |                                              |        |        |        |        |        |
|----|----------------------------------------------|--------|--------|--------|--------|--------|
| 15.| NCO/OH Ratio                                 | 1.62/1 | 1.62/1 | 2.07/1 | 1.80/1 | 1.80/1 |
| 16.| Mc                                           | 742    | 1157   | 2300   | 1367   | 966    |
| 17.| Percent Solids                               | 50%    | 50%    | 50%    | 50%    | 50%    |
| 18.| Viscosity, initial                           | 15     | 60     | 280    | 34     | 12     |
| 19.| Viscosity, aged                              |        |        |        |        |        |
| 20.| Days aged                                    |        |        |        |        |        |
| 21.| NCO Content, % by weight of total composition|        |        |        |        |        |
| 22.| NCO (start)                                  | 9.15   | 9.15   | 6.20   | 8.92   | 9.83   |
| 23.| NCO (theory)                                 | 3.51   | 3.51   | 3.30   | 3.96   | 4.37   |
| 24.| NCO (actual)                                 | 5.67   | 4.05   | 3.75   | 5.28   | 9.30   |
| 25.| % Completion                                 | 61.6%  | 91.0%  | 84.5%  | 73.5%  | 9.7%   |
| 26.| % Unreacted OH                               | 0.87%  | 0.22%  | 0.18%  | 0.53%  | 2.0%   |
| 27.| % Catalyst                                   | 0.051% | 0.119% | 0.24%  | 0.0015%| 0.013% |

|     |         |         | EXAMPLE |         |         |         |         |
|-----|---------|---------|---------|---------|---------|---------|---------|
|     | XV      | XVI     | XVII    | XVIII   | XIX     | XX      | XXI     |
| 1.  | 10560   | 264     | 238     | 188.6#  | 238     | 294     | 238     |
| 2.  |         |         |         |         |         |         |         |
| 3.  |         |         | 65      | 51.5#   | 65      | 61.3    | 65      |
| 4.  |         |         |         |         |         |         |         |
| 5.  | 3400    | 55      |         |         |         |         |         |
| 6.  |         | 83      |         |         |         |         |         |
| 7.  |         |         |         |         |         |         |         |
| 8.  |         |         | 100     | 79.9#   | 100     | 94.4    | 100     |
| 9.  |         |         |         |         |         |         |         |
| 10. |         |         |         |         | 0.1     | 0.16    | 0.04    |
| 11. |         |         | None    | None    |         |         |         |
| 12. | 2.0     | 0.03    |         |         |         |         |         |
| 13. | 21500   | 402     | 403     | 320#    | 403     | 450     | 403     |
| 14. | 35462   | 804.03  | 806     | 640#    | 806.1   | 899.86  | 806.04  |
| 15. | 2.0/1   | 2.0/1   | 1.8/1   | 1.8/1   | 1.80/1  | 2.36/1  | 1.80/1  |
| 16. | 1047    | 1177    | 1008    | 1008    | 1008    | 1191    | 1008    |
| 17. | 39.4%   | 50%     | 50%     | 50%     | 50%     | 50%     | 50%     |
| 18. | 10      | 150     | 10      | 10      | 20      |         |         |
| 19. |         |         | 20      | 10      | 22      |         |         |
| 20. |         |         | 42      | 42      | 7       |         |         |
| 21. |         |         |         |         |         |         |         |
| 22. | 9.44    | 10.45   | 9.38    | 9.38    | 9.38    | 10.40   | 9.38    |
| 23. | 4.72    | 5.22    | 4.17    | 4.17    | 4.17    | 5.98    | 4.17    |
| 24. | 5.76    | 8.60    | 9.25    | 8.90    | 7.67    | 7.95    | 9.25    |
| 25. | 78.0%   | 35.4%   | 2.5%    | 9.2%    | 32.8%   | 55.5%   | 2.5%    |
| 26. | 0.42%   | 1.37%   | 2.05%   | 1.92%   | 1.42%   | 0.80%   | 2.05%   |
| 27. | 0.0056% | 0.0037% | None    | None    | 0.00012%| 0.00018%| 0.00005%|

\# = pounds

|                     | EXAMPLE |         |         |         |         |
|---------------------|---------|---------|---------|---------|---------|
|                     | XXII    | XXIII   | XXIV    | XXV     | XXVI    |
| IPDI                | 233     | 333     | 222     | 222     | 210*    |
| TERACOL 650         | 150     | 40      |         |         |         |
| PLURACOL TP440      |         | 186     |         |         |         |
| PEP 450             | 75      |         |         |         |         |
| PCP 0310 Polyester  |         |         | 300     |         |         |
| VORANOL 2026        |         |         |         | 85      | 85      |
| DBTL 10%            | 2.5     | 2.9     | 2.6     |         |         |
| DBTL 100%           |         |         |         | 0.2     | 0.2     |
| Xylene              | 460     | 559     | 522     | 307     | 295     |
| Total Weight        | 920.5   | 1120.9  | 1046.6  | 614.2   | 590.2   |
| NCO/OH Ratio        | 1.73/1  | 2.06/1  | 2.0/1   | 2.0/1   | 2.0/1   |
| Mc                  | 1221    | 1317    | 1566    |         |         |
| Percent Solids      | 50%     | 50%     | 50%     | 50%     | 50%     |
| Viscosity, initial  | 20      | 20      | 20      | 30      | 30      |
| Viscosity, aged     |         |         |         | 35      | 30      |
| Days aged           |         |         |         | 14      | 14      |
| NCO content, % by weight of total composition | | | | | |
| NCO (start)         | 9.56    | 11.25   | 8.02    | 13.70   | 14.24   |
| NCO (theory)        | 4.04    | 5.80    | 4.01    | 6.85    | 7.12    |
| NCO (actual)        | 5.48    | 7.95    | 4.99    | 10.19   | 9.01    |
| % Completion        | 74.0%   | 60.5%   | 75.5%   | 54.5%   | 73.5%   |
| % Unreacted OH      | 0.58%   | 0.87%   | 0.40%   | 1.35%   | 0.77%   |
| % Catalyst          | 0.027%  | 0.026%  | 0.025%  | 0.033%  | 0.034%  |

\* = TMDI

In the Tables on the preceding pages, several abbreviations and registered trade marks have been used. These are described in much greater particularity as follows:

IPDI is isophorone diisocyanate, 3-isocyanatomethyl-3,5,5-trimethylcyclohexyl-isocyanate TMDI is trimethyl hexamethylene diisocyanate DBTL is dibutyl tin dilaurate VORONOL P400 (Dow) is a polyether glycol from polypropylene oxide having a molecular weight of 400 and a hydroxyl number of 264–299

TERACOL 2000 (duPont) is a polyether glycol having a molecular weight of 2000 and a hydroxyl number of 107–118

VORANOL 2026 (Dow) is a polyether triol having a molecular weight of 260 and a hydroxyl number of 640–680

VORANOL 2070 (Dow) is a polyether triol having a molecular weight of 700 and a hydroxyl number of 224–251

PLURACOL TP440 (BASF Wyandotte) is a polyether triol having a molecular weighht of 424 and a hydroxyl number of 398

PCP 0310 is a caprolactone triol having a molecular weight of 900 and a hydroxyl number (mg. KOH/g.) of 187 (Union Carbide)

Molecular weights and hydroxyl numbers are normally average molecular weights and average hydroxyl numbers.

EXAMPLE XXVII

The procedures described in Example I are followed substantially as set forth therein with the exception that the 1800 grams of PLURACOL PeP 450 Tetrol is replaced by:

1600 grams of PLURACOL PeP 450 Tetrol and 146 grams of "QUADROL" (BASF Wyandotte), a N,N,N',N'-tetrakis (2-hydroxypropyl)-ethylenediamine, a liquid tetrol having a molecular weight of 292 and a hydroxyl number of 555.

The reaction proceeds more quickly but, otherwise, the results are generally comparable to the results of Example I.

EXAMPLE XXVIII

The procedures described in Example I are followed substantially as set forth therein with the exception that the 6900 grams of HYLENE W diisocyanate is replaced by 4550 grams of a mixture of 2,4-tolylene diisocyanate and 2,6-tolylene diisocyanate.

The reaction of this Example proceeds more quickly than the reaction of example I and care must be taken to make sure that the reaction temperatures remain within the descried ranges. Otherwise, the results of this Example are generally comparable to the results obtained in Example I. Although numerous specific Examples of the present inventive concept have been described, it is to be realized that the broader aspects thereof are not to be construed as limited thereto, nor to the specific materials and conditions particularly disclosed therein, but to include various other equivalent materials and conditions, as set forth within the scope of the attached claims. It is to be understood that any suitable changes, modifications, and variations may be made without departing from the spirit and the scope of the invention.

What is claimed is:

1. A method of forming a liquid, low viscosity, low molecular weight, cross-linkable, stable polyurethane prepolymer which possesses excellent shelf-life and storage-life and which comprises: reacting an aliphatic polyisocyanate with a polyhydroxy compound having a molecular weight of from about 62 to about 3000, selected from the group consisting of triols, mixtures of triols and diols, and mixtures of tetrols and diols, the NCO/OH ratio of said aliphatic polyisocyanate to said polyhydroxy compound being from about 0.7:1 to about 6:1, the reaction between said aliphatic polyisocyanate and said polyhydroxy compound taking place in the presence of a suitable inert, non-reactive organic solvent at a reaction temperature of from about 0° C. to about 70° C. for a reaction time of from about ½ hour to about 12 hours in the presence of from about 0.00005% by weight to about 0.8% by weight of a catalyst, based on the total weight of the reaction mixture; terminating said reaction short of completion at a precent completion of reaction of from about 30% to about 80% by lowering the temperature of the reaction mixture to a substantially non-active state, whereby there is formed a liquid, low viscosity, low molecular weight, cross-linkable stable polyurethane prepolymer containing from about 2% by weight to about 30% by weight of unreacted NCO and from about 0.05% by weight to about 10% by weight of unreacted OH in said reaction mixture and having excellent shelf-life and storage-life; and maintaining said reaction mixture at said lowered temperature after said reaction is terminated short of completion, whereby said reaction does not proceed to any material extent.

2. A method as defined in claim 1, wherein said NCO/OH ratio is in the range of from about 1.6:1 to about 4:1.

3. A method as defined in claim 1, wherein said reaction temperature is in the range of from about 0° C. to about 40° C.

4. A method as defined in claim 1, wherein said reaction time is in the range of from about ½ hour to about 5-½ hours.

5. A method as defined in claim 1, wherein said polyisocyanate is a diisocyanate.

6. A method as defined in claim 1, wherein the viscosity of said reaction mixture at the time of termination of reaction is: from about 10 centipoises to about 100 centipoises for reaction mixtures having a solids content of from about 20% to about 50%; from about 20 centipoises to about 400 centipoises for reaction mixtures having a solids content of from about 50% to about 70%; and in excess of 400 centipoises for reaction mixtures having a solids content greater than 70% and up to 100% but still being flowable and readily pourable and usable, said centipoise values being obtained with a Brookfield No. 2 spindle at 20 r.p.m. at room temperatures with xylene as the suitable inert, non-reactive organic solvent.

7. A method as defined in claim 1 wherein the reaction is carried out in the presence of from about 0.0005% by weight to about 0.36% by weight of a catalyst, based on the total weight of the reaction mixture.

8. A method as defined in claim 1, wherein said reaction temperature is in the range of from about 21° C. to about 39° C.

9. A method as defined in claim 1, wherein said polyurethane prepolymer contains from about 0.1% by weight to about 6% by weight of unreacted OH.

10. A method as defined in claim 1, wherein said polyurethane prepolymer contains from about 0.18% by weight to about 2% by weight of unreacted OH.

11. A method as defined in claim 1, wherein said aliphatic polyisocyanate is mixed with said suitable inert, non-reactive organic solvent and said polyhydroxy compound is added thereto.

* * * * *